US006136238A

United States Patent [19]

Rasshofer et al.

[11] Patent Number: 6,136,238

[45] Date of Patent: Oct. 24, 2000

[54] DEVICE AND PROCESS FOR PRODUCING PLASTIC COMPONENTS, ESPECIALLY POLYURETHANE MOLDINGS

[75] Inventors: Werner Rasshofer; Henry Müller, both of Cologne; Achim Symannek, Leichlingen, all of Germany

[73] Assignee: Bayer Aktiengesellschaft, Leverkusen, Germany

[21] Appl. No.: 09/142,445

[22] PCT Filed: Feb. 27, 1997

[86] PCT No.: PCT/EP97/00952

§ 371 Date: Sep. 4, 1998

§ 102(e) Date: Sep. 4, 1998

[87] PCT Pub. No.: WO97/34021

PCT Pub. Date: Sep. 18, 1997

[30] Foreign Application Priority Data

| | | | |
|---|---|---|---|
| Mar. 12, 1996 | [DE] | Germany | 196 09 610 |
| Nov. 27, 1996 | [DE] | Germany | 196 49 111 |

[51] Int. Cl.[7] .......... B29C 41/38; B29C 44/02

[52] U.S. Cl. .......... 264/51; 249/135; 264/299

[58] Field of Search .......... 249/114.1, 135; 264/338, 51, 299

[56] References Cited

U.S. PATENT DOCUMENTS

| | | | |
|---|---|---|---|
| 3,539,144 | 11/1970 | Krug | 249/114.1 |
| 4,788,034 | 11/1988 | Brandis et al. | 420/75 |
| 5,112,025 | 5/1992 | Nakayama et al. | 264/338 |
| 5,401,785 | 3/1995 | Kumagai et al. | 521/112 |
| 5,645,795 | 7/1997 | Beguinot et al. | 420/106 |
| 5,728,328 | 3/1998 | Senda et al. | 264/338 |

OTHER PUBLICATIONS

Menges et al (Kunststofftechnik 13 (month unavailable) 1974 No. 9/10 pp. 181 et seq.

Patent Abstracts of Japan, vol. 15, No. 263, Jul. 4, 1991 & JP 03 095939 A (Hitachi Metals Ltd.) Apr. 16, 1991.

Patent Abstracts of Japan, vol. 12, No. 56 Feb. 19, 1988 & JP 62 202050A (Kobe Steel Ltd.) Sep. 5, 1987.

Patent Abstracts of Japan. vol. 18, No. 533, Oct. 11, 1994, & JP 06 184695 (Hitachi Ltd.) Jul. 5, 1994.

Patent Abstracts of Japan, vol. 16, No. 362, Aug. 5, 1992 & JP 04 116139A (NKK Corp.) Apr. 16, 1992.

*Primary Examiner*—Allan R. Kuhns
*Attorney, Agent, or Firm*—Joseph C. Gil; Lyndanne M. Whalen; Diderico van Eyl

[57] ABSTRACT

The present invention relates to a process for preparing solid, microcellular or expanded plastic molded items, characterized in that said molded items are produced in molds in which the internal surfaces consist of steel with the percentage composition:

a) Fe: having a wt % greater than 0 wt % and less than 100 wt %;

b) at least one element selected from the group consisting of W, Mo, or V, wherein if W is selected, W is present from a range greater than 0 wt % to 40 wt %; wherein if Mo is selected, Mo is present from a range greater than 0 wt % to 12 wt %; and if V is selected, V is present from a range greater than 0 wt % to 5 wt %;

c) at least one element selected from the group consisting of Cr, Al, wherein if Cr is selected, Cr is present in a concentration of greater than 0 wt % to 15 wt %; and if Al is selected, Al is present in a concentration of greater than 0 wt % to 15 wt %;

d) optionally, carbon at a concentration ranging from 0.1 to 1.5 wt %;

e) optionally, cobalt at a concentration ranging from 0.1 to 10 wt %; and f) optionally, nitrogen in a nitriding layer at a concentration ranging from greater than 0 wt % to 10 wt %.

19 Claims, No Drawings

DEVICE AND PROCESS FOR PRODUCING PLASTIC COMPONENTS, ESPECIALLY POLYURETHANE MOLDINGS

FIELD OF THE INVENTION

The application relates to an improved process for producing plastic items, in particular polyurethane moulded items, wherein a device for producing polyurethane moulded items is used in which the internal surfaces consist entirely or partly of the steel defined in more detail below.

BACKGROUND OF THE INVENTION

To produce plastic items, in particular polyurethane articles, the prior art makes use of a mould release agent which enables removal of articles from the mould. These are generally waxes, silicones or soaps, dissolved/dispersed in water and/or organic solvents. Extraordinary efforts have been made for a long time to reduce or completely eliminate the use of mould release agents. There is a number of reasons for this which are well known to a person skilled in the art:

cost of the mould release agent the expenditure of time and the extension of the working cycle as a result of applying the mould release agent the precautions which have to be taken when using a mould release agent (aerosols)

costs of the subsequent removal of the mould release agent by processes such as "powerwash" or sandblasting etc.

The majority of solutions proposed hitherto have been directed to the use of so called internal mould release agents, which are incorporated into the plastic (precursor) mixture before injecting this into the mould and which produce an improved mould separation effect. In fact, some improvements have been produced with selected polyurethane plastics. A number of applications for using internal mould release agents have been disclosed. Examples of these can be found e.g. in Oertel (Publisher), Kunststoffhandbuch Volume VII, Polyurethane, published by Hanser-Verlag. Here again, the internal release agent often has to be supported by use of a small amount of external mould release agent and thus post-treatment, e.g. if the item is to be lacquered, is required. Internal mould release agents may also exude and thus reduce the long term performance. On the other hand, there are cases where no internal mould release agents can be used, for example in the case of metallic inserts which have to exhibit firm adhesion, e.g. foam-padded steering wheels.

Suggestions for improving the mould material have also been disclosed. The work of Menges et al. (Kunststofftechnik 13 (1974), No. 9/10, p. 181 et seq.), has disclosed that aluminium has substantially better release behaviour, that is less adhesion, for polythurethane than steel moulds. However aluminium moulds cannot be used for mass production because they are not sufficiently wear resistant. Ceramic moulds have also been suggested for improved separation, and siliconised, galvanised, nickel-plated, chrome-plated moulds and moulds coated with PTFE etc. have also been proposed. Moulds which have been provided with surface coatings can only be repaired, if at all, at great expense when they become damaged. None of these modifications to steel surfaces has been incorporated into an industrial scale process.

All in all there is still a high demand for polyurethane moulded items which have been produced using no mould release agents or at least very little mould release agent. Economic, ecologic and occupational hygiene reasons have been put forward as reasons for this.

SUMMARY OF THE INVENTION

The object of the present invention was to provide a process which enables improved separating behaviour for plastic parts, in particular those made from polyurethane plastics, and which permits the improved production of moulded articles.

Surprisingly, it was found that separating characteristics could be achieved which exceeded all those in previously known processes if the production of moulded articles is performed in moulds in which the internal surfaces entirely or partly consist of optionally nitrided steel with the following percentage composition.

a) Fe:<100 wt. % b) at least one element from the group
   W: 0 to 40 wt. %, preferably 2 to 30 wt. %, in particular 3 to 10 wt. %
   Mo: 0 to 12 wt. %, preferably 0.1 to 5 wt. %, in particular 0.5 to 2 wt. %
   V: 0 to 5 wt. %, preferably 0.5 to 4 wt. %, in particular 1 to 3 wt. % c) at least one element from the group
   Cr: 0 to 15 wt. %, preferably 1 to 6 wt. %,
   Al: 0 to 15 wt. % d) C: 0.1 to 1.5 wt. %, preferably 0.15 to 1.0 wt. % and optionally e) Co: 0 to 10 wt. %, preferably 2 to 8 wt. %, in particular 4 to 6 wt. % and other elements such as S, Ti, Ni, and optionally f) N: 0 to 10 wt. % of N in a nitriding layer.

DETAILED DESCRIPTION OF THE INVENTION

The present invention therefore provides a process for producing plastic items, characterised in that they are produced in moulds in which the internal metallic surface(s) consist of steel with the percentage composition a) Fe:<100 wt. % b) at least one element from the group W, Mo, V with a concentration of
   W: 0 to 40 wt. %, preferably 2 to 30 wt. %, in particular 3 to 10 wt. %
   Mo: 0 to 12 wt. %, preferably 0.1 to 5 wt. %, in particular 0.5 to 2 wt. %
   V: 0 to 5 wt. %, preferably 0.5 to 4 wt. %, in particular 1 to 3 wt. % c) at least one element from the group Cr, Al with a concentration of
   Cr: 0 to 15 wt. %, preferably 1 to 6 wt. %,
   Al: 0 to 15 wt. % d) optionally with carbon with a concentration of
   C: 0.1 to 1.5 wt. %, preferably 0.15 to 1.0 wt. % e) optionally with cobalt with a concentration of
   Co: 0 to 10 wt. %, preferably 2 to 8 wt. %, in particular 4 to 6 wt. % and other elements such as S, Ti, Ni, and f) optionally with nitrogen with a concentration of
   N: 0 to 10 wt. % N in a nitriding layer.

Polyurethane moulded items are preferably produced.

The present invention also provides a process for producing polyurethane moulded items from A) polyisocyanates and B) compounds with at least 2 hydrogen items which are able to react with isocyanates and have a molecular weight of 60 to 2000, optionally in the presence of chain-lengthening and/or cross-linking agents, blowing agents and flier auxiliary agents and additives, characterised in that they are produced in moulds in which the internal metal surface(s) consist of steel with the percentage composition a) Fe:<100 wt. % b) at least one element from the group

W: 0 to 40 wt. %, preferably 2 to 30 wt. %, in particular 3 to 10 wt. %

Mo: 0 to 12 wt. %, preferably 0.1 to 5 wt. %, in particular 0.5 to 2 wt. %

V: 0 to 5 wt. %, preferably 0.5 to 4 wt. %, in particular 1 to 3 wt. % c) at least one element from the group

Cr: 0 to 15 wt. %, preferably 1 to 6 wt. %,

Al: 0 to 15 wt. % d) C: 0.1 to 1.5 wt. %, preferably 0.15 to 1.0 wt. % and optionally e) Co: 0 to 10 wt. %, preferably 2 to 8 wt. %, in particular 4 to 6 wt. % and other elements such as S, Ti, Ni, and optionally f) N: 0 to 10 wt. % of N in a nitriding layer.

The use of these types of steels offers the following surprising advantages.

It is particularly surprising that even so called EMR polyurethanes, that is PUR resins which are processed using external mould release agents and contain no internal mould release agents, can now be processed without applying mould release agents.

Equally surprising is the fact that expanded polyurethanes with low density can now be processed without applying mould release agents.

Especially surprising is also the finding that the mould temperatures can be lowered considerably. As a result of this lowering of the mould temperature, the batch shrinkage process is intensified which facilitates removal of the article.

It is surprising to a person skilled in the art that, according to the invention, steel known per se has this effect, whereas tests, including those of the applicant, on obtaining improved separation with chrome-plated or nickel-plated moulds failed (independently of the repair problems associated with this type of metallised surface).

The solution according to the invention leads to a cost-effective production of plastic parts since application processes and post-treatments can be omitted entirely or to a large extent.

Suitable starting materials for producing moulded articles in moulds made from these types of steel are any plastics. Particularly suitable plastics are those in which, if no precautionary measures such as application of mould release agents are used, adhering chemical interactions occur between these plastics and the metallic surfaces due to the chemical nature of the plastic. These types of plastic are in particular reactive plastics such as SMC, epoxy and polyurethane/polyureas, in particular polyurethane/polyureas and other products of isocyanate-polyaddition chemistry.

In order to perform the process according to the invention for polyurethane moulded items, polyisocyanates A) are used:

1. The starting components are aliphatic, cycloaliphatic, arylaliphatic, aromatic and heterocyclic polyisocyanates, such as are described e.g. by W. Siefken in Justus Liebigs Annalen der Chemie, 562, pages 75 to 136, for example those of the formula $$Q\ (NCO)_n$$

in which n=2.4, preferably 2, and

Q represents an aliphatic hydrocarbon group with 2–18, preferably 6–10 carbon atoms, a cyclo-aliphatic hydrocarbon group with 4–15, preferably 5–10 carbon atoms, an aromatic hydrocarbon group with 6–15, preferably 6–13 carbon atoms, or an aryl aliphatic hydrocarbon group with 8–15, preferably 8–13 carbon atoms, e.g. 1,4-tetramethylene diisocyanate, 1,6-hexamethylene diisocyanate, 1,12-dodecane diisocyanate, cyclobutane-1,3 diisocyanate, cyclohexane-1,3- and 1,4 diisocyanate and any mixture of these isomers, 1-isocyanato-3,3,5-trimethyl-5-isocyanatomethyl-cyclohexane (DE-AS 1 202 785, U.S. Pat. No. 3,401,190), 2,4- and 2,6-hexahydro toluylene diisocyanate and any mixture of these isomers, hexahydro-1,3- and/or 1,4-phenylene diisocyanate, perhydro-2,4'- and/or 4,4'-diphenylmethane diisocyanate, 1,3- and 1,4-phenylene diisocyanate, 2,4- and 2,6-toluylene diisocyanate and any mixture of these isomers, diphenylmethane-2,4'- and/or 4,4' diisocyanate, naphthylene-1,5 diisocyanate.

Furthermore, the following compounds are also suitable for use according to the invention: trimethylmethane-4,4'4"-triisocyanate, polyphenyl-polymethylenepolyisocyanates such as are obtained by aniline/formaldehyde condensation and subsequent phosgenation and are described e.g. in GB patents 874 430 and 848 671, m- and p-isocyanatophenylsulfonyl-isocyanates in accordance with U.S. Pat. No. 3,454,606, perchlorinated aryl polyisocyanates such as are described in e.g. DE-AS 1 157 601 (U.S. Pat. No. 3,277,138), polyisocyanates with carbodiimide groups such as are described in DE-PS 1 092 007 (U.S. Pat. No. 3,152,162) and in DE-OS 2 504 400, 2 537 685 and 2 552 350, norbornane diisocyanates in accordance with U.S. Pat. No. 3,492,301, polyisocyanates containing allophanate groups such as are described e.g. in GB patent 994 890, BE patent 761 626 and NL patent application 7 102 524, polyisocyanates containing isocyanurate groups such as are described e.g. in U.S. Pat. No. 3,001,9731, in DE-PS 1 022 7890, 1 222 067 and 1 929 034 and 2 004 048, polyisocyanates containing urethane groups such as are described e.g. in BE patent 752 261 or in U.S. Pat. No. 3,394,164 and U.S. Pat. No. 3,644,457, polyisocyanates containing acylated urea groups in accordance with DEPS 1 230 778, polyisocyanates containing biuret groups such as are described e.g. in U.S. Pat. Nos. 3,124,605, 3,201,372 and 3,124,605 and in GB patent 889 050, polyisocyanates prepared by telomerisation reactions, such as are described e.g. in U.S. Pat. No. 3,654,106, polyisocyanates containing ester groups such as are described e.g. in GB patents 965 474 and 1 072 956, in U.S. Pat. No. 3,567,763 and in DE-PS 1 231 688, reaction products of the isocyanates mentioned above with acetals in accordance with DE-PS 1 072 385 and polyisocyanates containing polymeric fatty acid esters in accordance with U.S. Pat. No. 3,455,883.

It is also possible to use the distillation residues containing isocyanate groups which are produced during the industrial production of isocyanates, optionally dissolved in one or more of the previously mentioned polyisocyanates. Furthermore, it is possible to use any mixtures of the previously mentioned polyisocyanates.

Preferred polyisocyanates are:

Industrially readily available polyisocyanates are generally particularly preferred, e.g. 2,4- and 2,6-toluylene diisocyanate and any mixture of these isomers ("TDI"), polyphenyl-polymethylene-polyisocyanates such as are prepared by aniline/formaldehyde condensation and subsequent phosgenation ("crude MD") and poly-isocyanates containing carbodiimide, urethane, allophanate, isocyanurate, urea or biuret groups ("modified polyisocyanates"), in particular those modified polyisocyanates which are derived from 2,4- and/or 2,6-toluylene diisocyanate or from 4,4'- and/or 2,4'-diphenylmethane diisocyanate.

Component B)

Component B1) comprises compounds with groups which can react with isocyanate groups and have a molecular weight in the range 1800 to 12000, preferably 3000 to 7000, or a mixture of these types of compounds, wherein components b) in the context of the isocyanate addition reaction have an (average) functionality of 2.5, preferably 2.6 to 3.0 and in particular 2.8 to 3.0. Appropriate compounds which are particularly effective as component b) are polyetherpolyols or mixtures of polyetherpolyols corresponding to these specifications, such as are disclosed in DE-AS 2 622 951, column 6, line 65 to column 7, line 47, wherein also preferred according to the invention are those polyetherpolyols in which at least 50 wt. %, preferably at least 80 wt. % of the hydroxyl groups are primary hydroxyl groups. Polyesters, polythioethers, polyacetals, polycarbonates or polyester amides with hydroxyl groups which are disclosed by way of example in DE-AS 2 622 951 are also suitable as component b) according to the invention, provided they correspond to the specifications mentioned above but they are less preferred than polyether polyols.

Aminopolyethers or mixtures of aminopolyethers are also equally suitable as starting components B1) as long as they correspond to the specifications given above, ie polyethers with groups which can react with isocyanate groups which contain at least 50 equivalent-%, preferably at least 80 equivalent-%, of primary and/or secondary aromatically or aliphatically, preferably aromatically bonded amino groups and the remainder consist of primary and/or secondary, aliphatic bonded hydroxyl groups. Amino polyethers of this type which are suitable are described for example in EP-B-00 81 701, column 4, line 26 to column 5, line 40.

Also suitable as starting component B1), but less preferred, are polyesters which contain amino groups and which have a molecular weight in the range mentioned above.

Obviously any mixture of the polyhydroxyl compounds mentioned by way of example with the amino polyethers mentioned by way of example may also be used as component B1).

Component B2)

The optionally also incorporated polyols or polyamines are any non-aromatic compounds with at least two groups which can react with isocyanate groups and which have a molecular weight in the range 18, 60 to 1799, preferably 60 to 500, in particular 62 to 400. Suitable compounds are for example alcohols such as are disclosed in EP-B-00 81 701, column 9, lines 32 to 50; the following alcohols are particularly preferred as component B2): EG, DEG, TEG, PG, DPG, TPG, butanediol, hexanediol. Also suitable are for example aliphatic polyamines with ether groups, for example polypropylene oxides with terminal primary amino groups with molecular weights in the range mentioned above. Polyols which have cycloaliphatic rings such as for example 1,4-dihydroxy cyclohexane or 1,4-bis-hydroxymethylcyclohexane and polyamines such as for example 1,4-cyclohexane diamine, isophorone diamine, bis-(4-aminocyclohexyl)-methane, bis-(3-methyl-4-aminocyclohexyl)-methane are also suitable. Polyols are preferred over polyamines.

Component B3)

The diamines incorporated as an optional further structural component B3) are aromatic diamines of the type mentioned by way of example in EP-B-00 81 701, column 5, line 58 to column 6, line 34, wherein the diamines which are described as preferred there are also preferred in accordance with this invention.

Optionally used auxiliary agents and additives B4) for the preparation of polyisocyanate-polyaddition products are for example internal mould release agents, if still required, catalysts for the polyisocyanate-polyaddition reaction, blowing agents, water, surface active additives, cell regulators, organic and inorganic pigments, colourants, UV stabilisers and thermal stabilisers, plasticisers or fungicidal and bacteriocidal substances, such as are described for example in EP-B-00 81 701, column 6, line 40 to column 9, line 31.

Included among the optionally used auxiliary agents and additives are fillers and/or reinforcing substances which are known per se, such as for example barium sulphate, kieselguhr, chalk whiting, mica or in particular glass fibres, LC fibres, glass flakes, glass beads, aramide fibres or carbon fibres.

Performing the Process According to the Invention

The reaction components are reacted according to the invention by a one stage process, a prepolymer process or a semi prepolymer process known per se, wherein mechanical devices are often used, e.g. those which are described in U.S. Pat. No. 2,764,565. Details about processing devices which may also be used according to the invention are described in Kunststoff-Handbuch, Volume VII, published by Vieweg und Höchtlen, Carl-Hanser-Verlag, Munich 1966, e.g. on pages 121 to 205.

The invention also provides a device for performing the process according to the invention described above.

According to the invention, the device consists of steel with the following percentage composition a) Fe:<100 wt. % b) at least one element from the group
 W: 0 to 40 wt. %, preferably 2 to 30 wt. %, in particular 3 to 10 wt. %
 Mo: 0 to 12 wt. %, preferably 0.1 to 5 wt. %, in particular 0.5 to 2 wt. %
 V: 0 to 5 wt. %, preferably 0.5 to 4 wt. %, in particular 1 to 3 wt. % c) at least one element from the group
 Cr: 0 to 15 wt. %, preferably 1 to 6 wt. %,
 Al: 0 to 15 wt. % d) C: 0.1 to 1.5 wt. %, preferably 0.15 to 1.0 wt. % also optionally e) Co: 0 to 10 wt. %, preferably 2 to 8 wt. %, in particular 4 to 6 wt. % and other elements such as S, Ti, Ni, and optionally f) N: 0 to 10 wt. % of N in a nitriding layer.

Due to the optionally performed nitriding surface treatment process for the steel, interactions between the metal surface atoms and reactive groups in the resins and reactive resins being used can be reduced or avoided. The nitriding treatment leads to a further increase in surface hardness.

These types of optionally already enhanced steels are known to the person skilled in the art per se, in particular nitrided types of steel in accordance with DIN 17 007. These are optionally subjected to known surface modification processes for nitriding such as salt bath nitriding, gas (phase) or plasma nitriding and ionic nitriding.

Suitable starting steels and these processes are described e.g. in

Lehrheft zum Selbststudium der DAG-Technikum, Essen 1982, Werkstoffkunde, Volume 4, page 34 et seq.;

Lehrheft zum Selbststudium der DAG-Technikum, Essen 1982, Werkstoffkunde, Volume 2, page 25 et seq.;

Fachkunde Metall, Europa-Verlag, 48th edition 1987;

Tabellenbuch Metall, Europa-Verlag, 38th edition, p.106;

Werkstoffkunde für Praktiker, Europa-Verlag, 2nd edition 1985, p.60.

They may optionally be subjected to further mechanical surface treatment by polishing etc.

Products produced in accordance with the invention may be used for the following purposes: e.g. furniture upholstering, textile inserts, mattresses, car seats, arm rests, expanded foam items and structural elements, seat and instrument cladding, vehicle body elements, supporting units, door internal claddings, steering wheels, housings of all kinds.

EXAMPLES

Example 1

Separating Trial with an IMR Material

Bayflex 110 IMR: VP.PU 767 AX 505 BX/Desmodur PA 09

Polyol component 67.40 parts of a polyether with OH index of 35, obtained by blockwise addition of first 87 wt. % of polypropylene oxide and then 13 wt. % of ethylene oxide to trimethyolpropane.

2 parts of a polyricin oleic ester with an acid value of<5.

4.7 parts of a 2:1:1 mixture of 24 parts of a mixture of 65 parts of 1-methyl-3, -5diethyl-2,4-diaminobenzene and 35 parts of 1-methyl-3,5-diethyl-2,6-diamino-benzene, zinc stearate and bis-(3-dimethylaminopropyl)-amine.

0.7 parts of an amino catalyst from Air Products 0.1 parts of a tin catalyst from Witco 0.1 parts of a siloxane stabiliser from Goldschmidt AG.

100 parts of this polyol formulation are processed with 66.2 parts of a urethane modified MDI with an NCO content of 24.5 wt. %. Density of the sheets=about 1 1/kg.

Result: No adhesion to the steel which is an essential component of the invention, it is not intended to terminate the trial series.

Example 2

Separating Trial with EMR Materials

Bayflex 110 EMR: VP.PW 505 BX/Desmodur PA 09

Polyol Component:

76.60 parts of a polyether with OH index of 27, obtained by blockwise addition of first 87 wt. % of propylene oxide and then 13 wt. % of ethylene oxide to trimethyolpropane.

21 parts of a mixture of 65 parts of 1-methyl-3,5-diethyl-2,4-diaminobenzene and 35 parts of 1-methyl-3,5-diethyl-2,6-diaminobenzene 0.3 parts of an amine catalyst from Air Products 0.1 parts of a tin catalyst from Witco 4.5 parts of an adduct of propylene oxide and ethylene diamine with an OH index of 1600 mgKOH/g.

100 parts of this polyol formulation are processed with 56.7 parts of a urethane modified MDI with an NCO content of 24.5 wt. %. Density of the sheets=about 1 1/kg.

Result: no adhesion on the steel which is an essential component of the invention, it is not intended to terminate the trial series.

Example 3

Separating Trial with EMR Materials

Baydur• Integral Rigid Foam

Polyol component:

38.10 parts of a polyether with an OH index of 27, obtained by blockwise addtion of first 87 wt. % of propylene oxide and then 13 wt. % of ethylene oxide to trimethylol propane.

33.60 parts of a polyether with an OH index of 865, obtained by addition of propylene oxide to trimethylolpropane.

22.40 parts of a polyether with an OH index of 1010, obtained by addition of propylene oxide to trimethylolpropane.

1.6 parts of an amine catalyst from Air Products.

2.7 parts of a stabiliser based on silicon.

1.6 parts of water.

100 parts of this polyol formulation are processed with 164.4 parts of a crude MDI Desmodur 44V20 with an NCO content of 31.5 wt. %. Density=about 1 1/kg.

Result: No adhesion to the steel which is an essential part of the invention, it is not intended to terminate the trial series.

Example 4

Non Nitrided Nitriding Steel

No difference from trials 1 to 3 detectable.

Example 5

Comparison Trial Normal Mould Steel

With the material from example 1 about 30 to 40 mould release cycles, with the materials from examples 2 or 3 about 2 to 10 mould release cycles, accordingly each must be coated with mould release agent.

Example 6

Comparison Trial Bondur Al-alloy

Using the material from example 1 about 60 to 100 mould release cycles, with the materials from examples 2 or 3 about 5 to 30 mould release cycles, therefore each must be coated with mould release agents.

What is claimed is:

1. A process for preparing a solid, microcellular or expanded plastic molded item, characterized in that said molded item is produced in a mold having an internal surface consisting of steel with the percentage composition consisting of:

a) Fe: having a wt % greater than 0 wt % and less than 100 wt %;

b) at least one element selected from the group consisting of W, Mo and V, wherein if W is selected, W is present from a range greater than 0 wt % to 40 wt %; wherein if Mo is selected, Mo is present from a range greater than 0 wt % to 12 wt %; and if V is selected, V is present from a range greater than 0 wt % to 5 wt %;

c) at least one element selected from the group consisting of Cr and Al, wherein if Cr is selected, Cr is present in a concentration of greater than 0 wt % to 15 wt %; and if Al is selected, Al is present in a concentration of greater than 0 wt % to 15 wt %;

d) optionally, carbon at a concentration ranging from 0.1 to 1.5 wt %;

e) optionally, cobalt at a concentration ranging from 0.1 to 10 wt %; and f) optionally, nitrogen in a nitriding layer at a concentration ranging from greater than 0 wt % to 10 wt %.

2. A process according to claim 1, wherein if W is selected, W is present from a range from 2 wt % to 30 wt %; wherein if Mo is selected, Mo is present from a range from 0.1 wt % to 5 wt %; and if V is selected, V is present from a range of 0.5wt % to 4wt %.

3. A process according to claim 2, wherein if W is selected, W is present from a range from 3 wt % to 10 wt %; wherein if Mo is selected, Mo is present from a range from 0.5 wt % to 2 wt %; and if V is selected, V is present from a range of 1 wt % to 3wt %.

4. A process according to claim 1, wherein if Cr is selected, Cr is present in a range from 1 to 6 wt %.

5. A process according to claim 1, wherein carbon is present at a concentration ranging from 0.15 to 1.0 wt %.

6. A process according to claim 1, wherein cobalt is present at a concentration ranging from 2 to 8 wt %.

7. A process according to claim 6, wherein cobalt is present at a concentration ranging from 4 to 6 wt %.

8. A process according to claim 1, wherein the internal surface of the mold contains nickel at a concentration of greater than 0.3 wt % with 8 to 10 wt % of N in the nitriding layer.

9. A process according to claim 1, wherein the plastic molded items are produced by reacting a) polyisocyanates and b) at least one compound with at least two hydrogen atoms which can react with isocyanates, and optionally, in the presence of chain-lengthening and/or cross-linking agents, blowing agents, and other auxiliary agents and additives in said mold.

10. The process of claim 1, wherein the molded item is made without applying mold release agents.

11. A device for producing microcellular or expanded plastic molded items, wherein the internal surfaces of said device consist of steel with a composition consisting of:

a) Fe: having a wt % greater than 0 wt % and less than 100 wt %;

b) at least one element selected from the group consisting of W, Mo and V, wherein if W is selected, W is present from a range greater than 0 wt % to 40 wt %; wherein if Mo is selected, Mo is present from a range greater than 0 wt % to 12 wt %; and if V is selected, V is present from a range greater than 0 wt % to 5 wt %;

c) at least one element selected from the group consisting of Cr and Al, wherein if Cr is selected, Cr is present in a concentration of greater than 0 wt % to 15 wt %; and if Al is selected, Al is present in a concentration of greater than 0 wt % to 15 wt %;

d) optionally, carbon at a concentration ranging from 0.1 to 1.5 wt %;

e) optionally, cobalt at a concentration ranging from 0.1 to 10 wt %; and f) optionally, nitrogen in a nitriding layer at a concentration ranging from greater than 0 wt % to 10 wt %.

12. A device according to claim 11, wherein if W is selected, W is present from a range from 2 wt % to 30 wt %; wherein if Mo is selected, Mo is present from a range from 0.1 wt % to 5 wt %; and if V is selected, V is present from a range of 0.5 wt % to 4 wt %.

13. A device according to claim 12, wherein if W is selected, W is present from a range from 3 wt % to 10 wt %; wherein if Mo is selected, Mo is present from a range from 0.5 wt % to 2 wt %; and if V is selected, V is present from a range of 1 wt % to 3 wt %.

14. A device according to claim 11, wherein if Cr is selected, Cr is present in a range from 1 to 6 wt %.

15. A device according to claim 11, wherein carbon is present at a concentration ranging from 0.15 to 1.0 wt %.

16. A device according to claim 11, wherein cobalt is present at a concentration ranging from 2 to 8 wt %.

17. A device according to claim 16, wherein cobalt is present at a concentration ranging from 4 to 6 wt %.

18. A device according to claim 11, wherein an internal surface of the device contains nickel at a concentration of greater than 0.3 wt % with 8 to 10 wt % of N in the nitriding layer.

19. A device according to claim 11, wherein said device produces polyurethane molded items.

* * * * *